(12) United States Patent
Meth

(10) Patent No.: US 6,766,471 B2
(45) Date of Patent: Jul. 20, 2004

(54) USER-LEVEL CHECKPOINT AND RESTART FOR GROUPS OF PROCESSES

(75) Inventor: Kalman Meth, Netanya (IL)

(73) Assignee: International Business Machines Corporation, Armonk, NY (US)

(*) Notice: Subject to any disclaimer, the term of this patent is extended or adjusted under 35 U.S.C. 154(b) by 580 days.

(21) Appl. No.: 09/751,565

(22) Filed: Dec. 28, 2000

(65) Prior Publication Data

US 2002/0087916 A1 Jul. 4, 2002

(51) Int. Cl.$^7$ ................................................. G06F 11/00
(52) U.S. Cl. ............................ 714/16; 714/15; 714/19; 714/20; 714/38
(58) Field of Search ............................ 714/15, 16, 19, 714/20, 38

(56) References Cited

PUBLICATIONS

Plank, J., "An Overview of Checkpointing in Uniprocessor and Distributed Systems, Focusing on Implementation and Performance", Technical Report UT–CS–97–372, Jul. 1997, pp. 1–20.

Plank, J. et al., "Libckpt: Transparent Checkpointing Under Unix", USENIX Winter 1995 Technical Conference, New Orleans (USA), Jan. 1995, pp. 1–14.

Stevens, W., "Advanced Programming in the UNIX® Environment", *Unix Process Control Pipes*, Chapter 8, pp. 187–203, Chapter 14, pp. 427–434, USA, 1992.

Litzkow, M. et al., "Checkpoint and Migration of UNIX Processes in the Condor Distributed Processing System", Dr. Dobbs Journal Article #227, Feb. 1995, pp. 1–12.

*Primary Examiner*—Robert Beausoliel
*Assistant Examiner*—Michael Maskulinski
(74) *Attorney, Agent, or Firm*—Darby & Darby (57) ABSTRACT

The technique disclosed herein provides for simultaneously checkpointing all of the processes in a specified process group or family at the application level, and restoring those processes at a later time, optionally on a different machine, with the parent-child relationships restored intact. File descriptors that are shared among the processes at checkpoint time are restored to the family of processes such that the file descriptors are shared just as they were at the time of taking the checkpoint.

42 Claims, 4 Drawing Sheets

USER-LEVEL CHECKPOINT AND RESTART FOR GROUPS OF PROCESSES

BACKGROUND OF THE INVENTION

1. Field of the Invention

This invention relates to reconstruction of the state of interrupted computer programs. More particularly this invention relates to user-level checkpointing and restart of a program having multiple processes.

2. Description of the Related Art

Checkpointing is the procedure of saving the state of a running program so that it may be subsequently reconstructed and restarted, possibly on a different computer. Checkpoints are typically saved on computer readable storage media, and may be created at various times during the lifetime of an executing program. This is especially useful for long-running programs, where the likelihood of hardware failure during program execution increases with the length of time that the program has been executing. In addition, checkpointing has been found to be useful in debugging, for example the detection of boundary condition errors. The technique also has been helpful in rollback recovery, process migration, job swapping, and virtual time simulations.

Implementation of checkpointing has been attempted at various levels. A basic example is the process scheduler found on most multi-tasking operating systems. When a process is required to relinquish the central processing ently continue at a later time. Some operating systems, e.g., IRIX from SGI, CRAY, and CONVEX OS, provide kernel support to checkpoint and restart a program or a family of programs.

User level checkpointing has also been attempted at the application level. Programmers can incorporate necessary state information into their programs, for example intermediate computations, which can be recovered should execution be interrupted. While this technique is flexible, and amenable to performance optimization, it is a severe burden on the programmer.

Improved user level checkpointing is provided by the use of a specialized checkpointing library which is accessed by application programs, which is far less onerous to the programmer. Such a library is provided by the Condor system and in the UNIX™ environment using the library Libckpt. The checkpoint-restart mechanism of Condor has also been implemented for many varieties of UNIX.

Modern operating systems allow the state of the file system to be checkpointed. However, user level checkpointing techniques are usually unable to recover the state of the operating system. For example, on restart at the user level, the process identifier of each process will generally be different from its pre-checkpoint counterpart. This effectively prevents the use of run-time support methods that rely on the process identifier of the calling process. This is because the kernel controls the distribution of process identifiers, and a user-level checkpoint mechanism has no way to influence the choice of the process identifier of the restarted process. Thus a program that is checkpointed and restarted with a user-level mechanism may not assume that its process identifier is unique throughout the entire execution of the program. Another major drawback is that parent-child relationships of checkpointed processes cannot easily be restored. Such parent-child process relationships often involve strong dependency on the process identifiers of the processes involved. Indeed, the Condor system does not support checkpoint and restart of a family of processes; only a single process can be checkpointed at a time, and any relations to other processes that may be checkpointed at the same time cannot be restored.

It would be desirable to have a user-level checkpoint and restart mechanism that provides for the restoration of families of processes, where parent-child relationships and shared file descriptors are restored. This would allow for user-level checkpointing of a much larger class of processes than is possible with the current state of the art.

SUMMARY OF THE INVENTION

It is a primary advantage of some aspects of the present invention that a family of programs can be checkpointed and restored.

A technique is disclosed herein for simultaneously checkpointing all of the processes in a specified process group or family at the user or application level, and restoring those processes at a later time, optionally on a different machine, with the pre-existing parent-child relationships remaining intact. This technique also provides for file descriptors that are shared among the processes at checkpoint time to be restored to the family of processes such that the file descriptors are shared just as they were at the time of taking the checkpoint.

The invention provides a method of restoring interrelated computer processes at an application level. The method comprises checkpointing a plurality of members of a process group at a checkpoint time, and restoring the members to define a restored process group, wherein interrelationships of the members which existed immediately prior to the checkpoint time are unchanged among corresponding members of the restored process group.

According to an aspect of the invention, at least two of the members share file descriptors immediately prior to the checkpoint time. Each of the file descriptors has a pre-checkpoint value, and the method further includes maintaining a record of an order in which pre-checkpoint files were opened by each of the members, and restoring includes identifying a first file descriptor of an associated inherited file from a parent process of the restored process group thereof, responsive to the record of the order, executing a file duplication system call corresponding to the first file descriptor to yield a second file descriptor, wherein a value of the second file descriptor equals the pre-checkpoint value of the first file descriptor, and closing the associated inherited file that corresponds to the first file descriptor.

According to another aspect of the invention, one of the pre-checkpoint files is a pipe, and checkpointing also includes duplicating a pipe descriptor of the pipe to define a duplicate pipe descriptor and storing the duplicate pipe descriptor, thereafter reading data from the pipe, storing the data, rewriting the data into the pipe, retrieving the stored data, and writing the stored data into a restored pipe of the restored process group corresponding to the duplicate pipe descriptor.

According to a further aspect of the invention, checkpointing includes identifying a first process identifier of a first child process. Restoring includes creating a second child process that corresponds to the first child process, identifying a second process identifier of the second child process, intercepting a first system call that uses the first process identifier, and substituting the second process identifier for the first process identifier in the first system call.

According to another aspect of the invention, identifying the second process identifier is performed by executing a second system call to create a third child process, and identifying a return value of the second system call. The second system call can be a fork( ) call.

Still another aspect of the invention includes invoking a third system call, wherein the first process identifier is a parameter of the third system call. The third system call may be a kill( ) call.

An additional aspect of the invention includes delaying until the third child process has exited. Delaying is accomplished by invoking a fourth system call to direct a signal to the third child process, wherein the first process identifier is a parameter or a return value of the fourth system call. The fourth system call may be a wait( ) call.

According to a further aspect of the invention, checkpointing includes simultaneously transmitting a checkpoint signal to the members of the process group, and, responsive to the checkpoint signal, concurrently initiating checkpointing in all the members of the process group. The checkpoint signal may be generated by a killpg( ) system call.

Still another aspect of the invention includes of memorizing in each of the members of the process group a number of child processes created therefrom.

An additional aspect of the invention includes maintaining a first record in each of the members of the process group of a first process identifier of each of the child processes created therefrom, and maintaining a second record in each of the corresponding members of the restored process group comprising a second process identifier of each second child process corresponding to each of the child processes.

Another aspect of the invention includes checkpointing an exiting process at an exit time that is prior to the checkpoint time, and storing information of the exiting process, and restoring also includes recreating the exiting process in accordance with the stored information, and thereafter
restoring children of the exiting process.

The invention provides a computer software product, comprising a computer-readable medium in which computer program instructions are stored, which instructions, when read by a computer, cause the computer to checkpoint, at an application level, a plurality of members of a process group at a checkpoint time, and to restore the members, wherein interrelationships of the members which existed immediately prior to the checkpoint time are unchanged among corresponding members of the restored process group.

According to an aspect of the invention, at least two of the members share file descriptors immediately prior to the checkpoint time. Each of the file descriptors has a pre-checkpoint value, and the computer further maintains a record of the order in which pre-checkpoint files were opened by each of the members. Restoring includes identifying a first file descriptor of an associated inherited file from a parent process of the restored process group thereof. Responsive to the record of the order, a file duplication system call is executed, using the first file descriptor to yield a second file descriptor, wherein a value of the second file descriptor equals the pre-checkpoint value of the first file descriptor. The associated inherited file that corresponds to the first file descriptor is closed.

According to yet another aspect of the invention, one of the pre-checkpoint files is a pipe, and checkpointing also includes duplicating a pipe descriptor of the pipe to define a duplicate pipe descriptor, storing the duplicate pipe descriptor, thereafter reading data from the pipe, storing the data, rewriting the data into the pipe, retrieving the stored data, and writing the stored data into a restored pipe of the restored process group corresponding to the duplicate pipe descriptor.

The invention provides a computer system, comprising a memory for storage of program instructions, and an execution unit that accesses the program instructions in the memory for execution thereof, wherein the program instructions cause the computer to perform at an application level checkpointing a plurality of members of a process group at a checkpoint time, and restoring the members to define a restored process group, wherein interrelationships of the members which existed immediately prior to the checkpoint time are unchanged among corresponding members of the restored process group.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

The invention is disclosed herein primarily with reference to the Unix environment and the Condor system, but is not limited to these particular operating systems. Software programming code which embodies the present invention is typically stored in permanent storage of some type, such as a computer readable medium. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media, distributing software code via networks, and executing code on a computer system are well known and will not be further discussed herein. The software is operable with a conventional general purpose computer system having at least an execution unit, suitable memory, and appropriate I/O devices.

Figure 1:
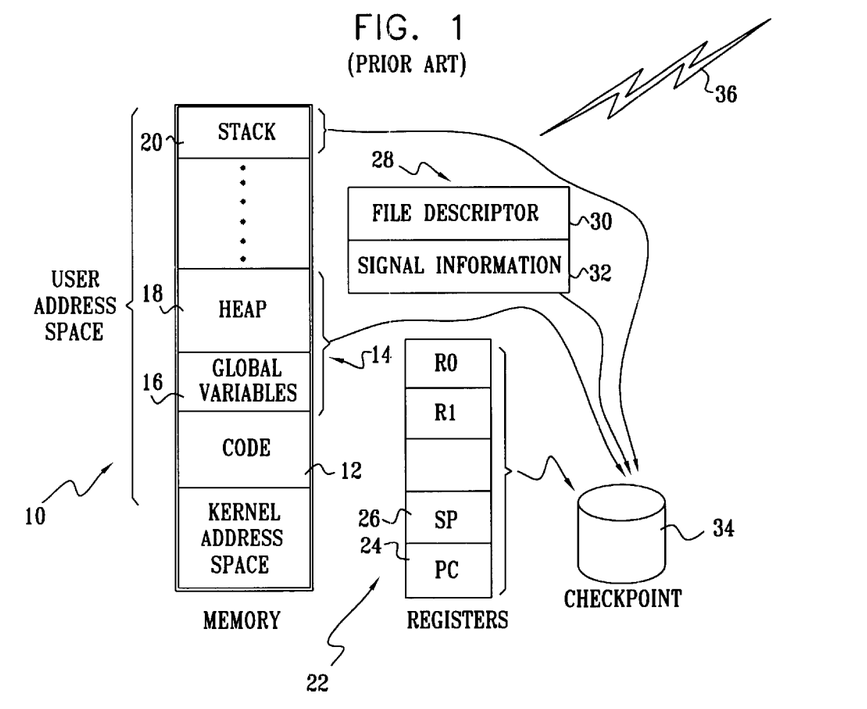
FIG. 1 is a diagram depicting the process of taking a checkpoint according to the prior art.

Turning now to the drawings, and to FIG. 1 thereof, the environment of a program 10 can be thought of as consisting of the following parts: the program code 12; the data section 14, which includes global data 16 and the heap 18; a stack 20, and register values 22, including program counter 24 (PC) and stack pointer 26 (SP). Also there is relevant program and system state information 28 which includes a set of open file descriptors 30, and the state of various signals 32. The file descriptors 30 are specific to each program. This means that a given file descriptor number may refer to different files in different programs. Information about the signals 32 is also maintained separately by the program and the state of a given signal need not be the same in different concurrently executing programs. The state information 28 concerning each program is typically maintained by the kernel of the system.

In the Condor system, the data section 14, state information 28, stack 20, and register values 22 are saved in a checkpoint file 34. Most other state information that is maintained by the kernel is not saved in the checkpoint file 34, and is therefore not subsequently restored. The program's registers, including the program counter 24 and stack pointer 26 are obtained using the UNIX setjmp( ) utility. The state information for the signals 32, which is maintained by the kernel, is obtained by the user-level checkpoint mechanism via standard UNIX system calls such as sigprocmask( ), sigaction( ), and sigpending( ). Information about the file descriptors 30 is obtained by the user-level checkpoint mechanism, which in a known manner intercepts the system calls that are used to open and close files, e.g., open( ), close( ), and dup( ). Thus, whenever the program opens a file with the open( ) system call, the Condor user-level checkpoint mechanism intercepts the open( ) system call and records for itself the name of the file being opened, or the file descriptor being duplicated, as well as the file descriptor that the system provides for that opened file. At checkpoint time, the file offset for each file descriptor is obtained by the lseek( ) system call, and is recorded in the checkpoint file.

It should be noted that extra overhead is incurred only when creating or destroying a file descriptor, but there is no extra overhead when reading or writing to the files by invoking the read( ) or write( ) system calls. Condor also supports checkpointing of programs that use shared libraries on some operating systems.

In Condor, the taking of a checkpoint is initiated by sending the process a checkpoint signal 36. Condor defines a checkpoint signal handler which is invoked upon receipt of the checkpoint signal. Inside the checkpoint signal handler, the process's state is saved in the checkpoint file 34.

Figure 2:
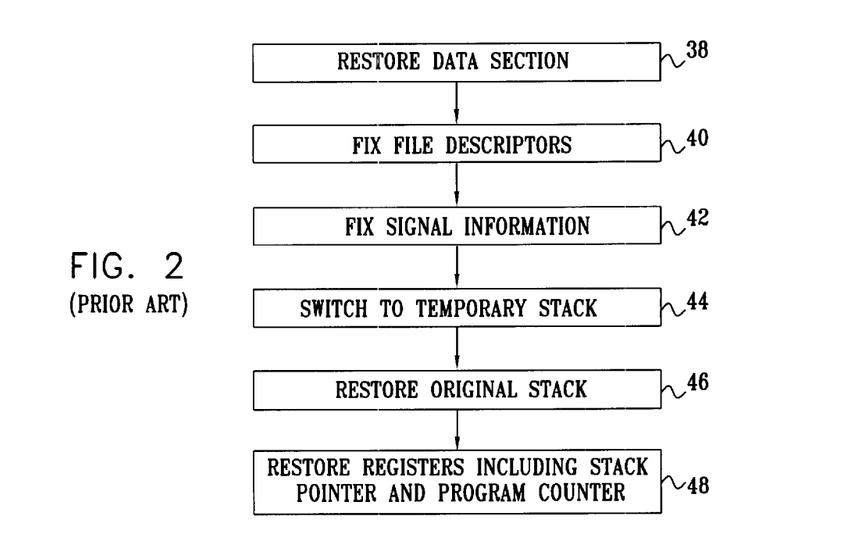
FIG. 2 is a flow chart showing the prior art technique of restoring a program.

The sequence of operations to restore a program according to the known Condor system is shown in FIG. 2. Condor adds some special code to a program before the main( ) routine is called in order to facilitate user-level checkpoint and restart. In this special piece of code, the program determines whether it is to run from the beginning or if it is being restored. If the program is to be restored, then the program, in a special code fragment that is executed before the procedure main( ), reads the checkpoint file to obtain the checkpoint information. At step 38 the program copies data from the checkpoint file to the program's data section to restore the data of the program to its state at the time of taking the checkpoint. The program then, at step 40, opens all of the files that were open at the time of the checkpoint and restores their file descriptors and offset values. The program's saved signal information is then restored at step 42. Finally, the program must restore its stack and registers. This is performed by running on a temporary stack, shown at step 44, copying the stack information from the checkpoint file to the original stack area at step 46, and restoring all of the register values to their values at checkpoint time at step 48. Step 48 is accomplished using the UNIX longjmp( ) mechanism. When restoring the register values, the stack pointer and program counter are also restored, which then enable the program to continue running from where it left off when the checkpoint was taken.

There are a number of restrictions that a program must adhere to in order to be checkpointable using user-level checkpointing. For example, Condor does not deal with processes that execute the fork( ) system call to create a child process, or which communicate with other processes via signals, sockets, pipes, etc. There is also no support for programs that use shared memory, semaphores, message queues, "special" files, and some other features. In order for file offsets to be restorable, the file must be accessed in a sequential manner. Condor provides no support for files that are accessed randomly. It is also assumed that the process to be checkpointed is well behaved. In particular, it is assumed that the program does not block the checkpoint signal. Despite the long list of restrictions, a significant number of programs can be checkpointed using Condor user-level checkpointing.

In the Condor system, checkpointing is generally performed for single-threaded programs. If a program uses a user-level threading package, such as some versions of Distributed Computing Environment (DCE) threads, where only one real thread is recognized by the kernel, then user-level checkpointing should be able to save and restore the program. If system supported threads are used, then some additional fixing up of thread information must be performed, depending on the particular system.

In the Condor system, where user-level checkpoint and restart are performed, the process identifier cannot be restored, since the kernel assigns process identifiers, and the user-level checkpoint and restart mechanisms have no direct influence over the kernel. Therefore the restarted process will acquire whatever new process identifier the system assigns when it is restarted. Condor therefore disallows checkpointed programs from using interfaces that depend on the process identifier of the checkpointed process, since this process identifier is not well defined for restarted processes. Thus the program according to the conventional Condor system may not use interfaces such as getpid( ), kill( ), fork( ), wait( ), or any other interfaces that depend on the program's process identifier.

It has been discovered by the inventor that certain of the above restrictions, particularly those relating to process identification, can be overcome by a method that provides an illusion that the process identifier of a checkpointed process has been restored. If the restarted program had created a child process using the fork( ) system call before the checkpoint, signals may be sent to the child process using the kill( ) system call, utilizing the original pre-checkpoint child process identifier that was returned in the pre-checkpoint fork( ) system call. Similarly, the restored parent process may use the wait( ) system call or a similar system call, possibly delaying until the child process exits, utilizing the pre-checkpoint child process identifier. The illusion is perpetrated by intercepting all of the system calls that use the process identifier, either as a parameter, or as a return value, and then making a translation between the pre-checkpoint process identifier and the new process identifier as obtained from the fork( ) following restart. Thus a process that refers to a child process by the process identifier obtained following a fork( ) system call can continue to refer to the child process by its original process identifier in subsequent calls to kill( ), wait( ), etc., even after the processes have been restored and have been assigned different process identifiers by the kernel. Similarly, a child process can send a signal to its parent, or to itself by referring to the original process identifier.

It should be noted that in the above sequence the use of the kill( ) system call is independent of the use of the wait( ) system call. A parent process need not use kill( ) or wait( ) at all.

In order to initiate a checkpoint of all of the processes in an entire family, a checkpoint signal is sent to all of the processes in the family. It is assumed that in general the processes to be checkpointed constitute a single process group, thus enabling the initiation of the checkpoint of all of the processes simultaneously by calling the killpg( ) system call to send a signal to all of the processes. If this is not the case, then synchronization may have to be performed among the checkpointed processes to ensure that they are indeed being checkpointed at the same time.

One major issue that must be dealt with is the restoration of file descriptors that are shared among several processes. In UNIX, a child process can inherit file descriptors from its parent, with the result being that a parent and child process share the same file descriptor. The kernel arranges for the child to inherit and share the file descriptors of its parent at the time of the fork( ) operation that created the child process. If the child process, in turn, creates its own child process by calling fork( ), then the grandchild process can also inherit and share the file descriptor that originated in the grandparental process. Subsequently various members of the family of processes may individually close some of the inherited file descriptors and obtain new file descriptors. In this situation there are some file descriptors that are shared by distant cousin processes, However other file descriptors, although having the same numerical values in different processes of the family, actually reference different file objects. The method according to the invention restores all of the processes in the group, maintaining all parent child relationships, and appropriately restoring each file descriptor that was valid at the time of taking the checkpoint. File descriptors that were shared at the time of the checkpoint are appropriately shared when the processes are restored, whether the file descriptors were truly shared at checkpoint time, or merely possessed the same numerical values. Also, following restoration, the various processes of the family are seen by themselves, their parents, and their children to have been restored with their original process identifiers. Thus system calls that depend on a process identifier, e.g. getpid( ), wait( ), work as expected. While there are still restrictions on checkpointable processes, the technique disclosed herein greatly expands the kinds of programs that can be checkpointed using user-level checkpointing.

In order to achieve this proper restoration, it is necessary to keep track of certain information whenever a child process is created with the fork( ) system call. Additional information must be maintained when a file descriptor is allocated by system calls, e.g., open( ), creat( ), dup( ), pipe( ) or freed, using calls such as close( ). If a process uses the call exec( ), thus overwriting its image, then this information must be maintained across the exec( ) operation. One way to accomplish this is by saving the information in a temporary file before the exec( ) call, and by reading the information from the temporary file when the resulting program begins to run. It is also necessary to keep track of the order in which child processes are created, and the order in which files are opened and closed relative to the creation of children. Each process keeps a counter of the number of children that it has created, or forked. The value of this counter is referred to herein as the "index" of the child that was created. For convenience, the value of the index is stored as the value that will be assigned to the next child to be created.

Each process keeps the following information for each child that it creates: original child process identifier; mapped (restored) child process identifier; and child index number.

For each process the information saved for each file at checkpoint time is as follows: file name; file descriptor; value of the open flags (r, w, or rw), if applicable; the file descriptor from which the file was duplicated, if applicable; the child index counter at time the file descriptor was created; the child index counter at the time the file descriptor was closed, if applicable; various flags including indications whether the file descriptor was inherited from its parent, whether the file descriptor had been closed; and whether the file descriptor is associated with a pipe. In some embodiments additional flags may be maintained. In addition, for each file descriptor that designates a file, the associated offset. The offset can be easily obtained using the lseek( ) system call.

The checkpoint library keeps a record of child processes that were created and a record of file descriptors that were created and destroyed during the life of the parent process, and stores the order in which these events occurred. Using this information, it is possible to restore shared file descriptors among a family of restored processes, as described below.

Figure 3:
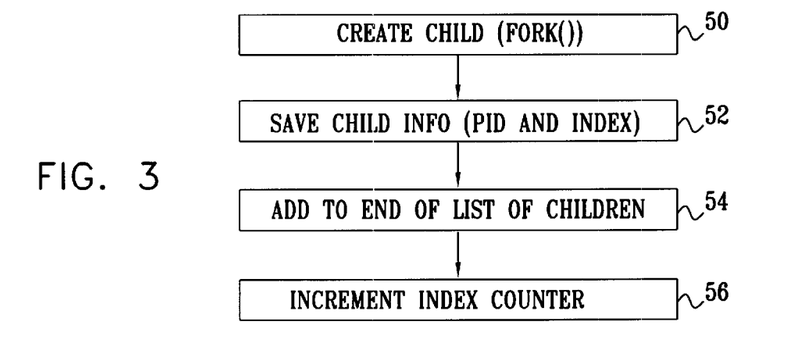
FIG. 3 is a flow diagram showing the creation of a child process according to the invention.

The steps taken at the time of creating a child process are depicted in FIG. 3. At step 50 the parent process forks the child process, and at step 52 the index and process identifier of the child are saved. At step 54 an entry is made at the end of the list of created children, the parent process records the process identifier of the created child process, and the process identifier of the child process is mapped to the child index that is stored by the parent process. Finally, at step 56 the index is incremented.

Figure 4:
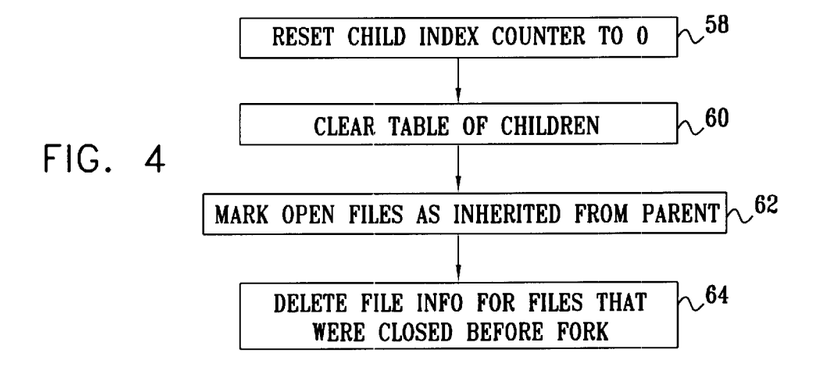
FIG. 4 is a flow diagram illustrating various operations that are preformed by a newly created child process according to the invention.

The operations performed by the newly created child process are shown in FIG. 4. When the child is created, it inherits all the data of the parent process, including the table of the parent's children, the child index number, and table of file descriptors. At step 58 the child process resets its child index number to zero, and at step 60 the child reinitializes its copy of the table of children processes, since the newly created child process doesn't yet have any children. The file descriptors that the child inherited from the parent remain valid. However, at step 62 the child marks those files as inherited in order that the shared file descriptors can be properly restored on restart. Any files that the parent closed before creating the child process are not inherited by the child process. The child therefore removes any such file descriptor information from its table of file descriptors at step 64.

Figure 5:
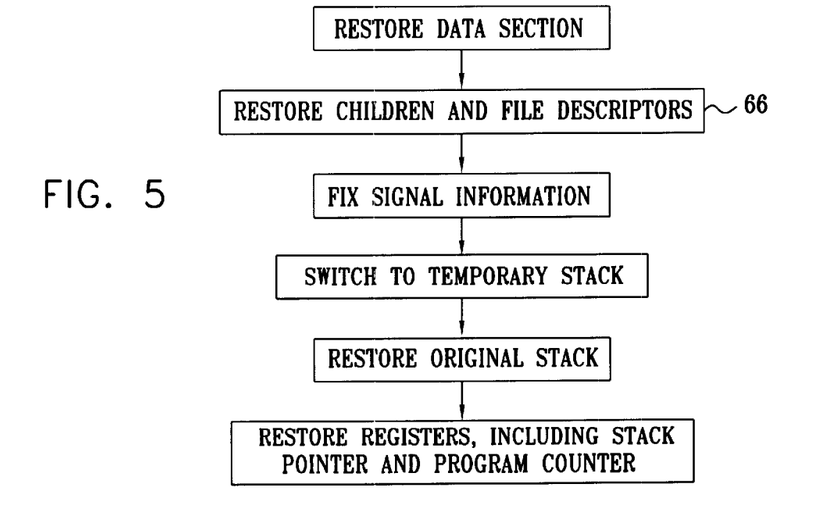
FIG. 5 is a flow diagram showing a sequence of operations for restoring a family of processes; according to the invention.

The sequence of operations to restore a family of processes is depicted in FIG. 5. First, the earliest ancestral process of the family is restored. The sequence of operations is similar to that depicted in FIG. 2, except that now it is necessary to intermingle file restorations and child process creation in step 66.

Figure 6:
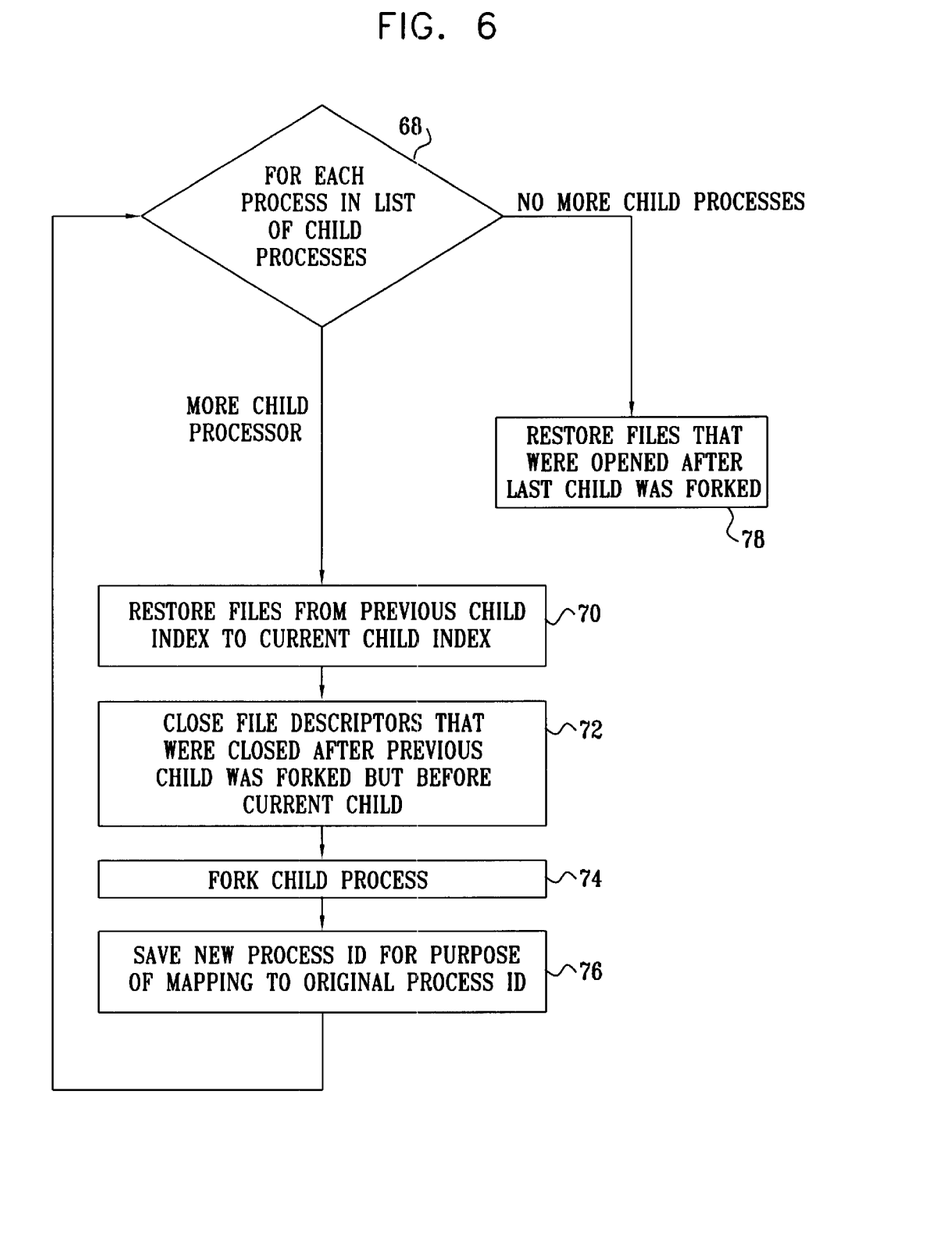
FIG. 6 is a flow chart illustrating the restoration of child processes.

Step 66 is depicted in greater detail in FIG. 6. At decision step 68 a test is made to determine if there are children to be recreated.

If there are remaining children of the process being restored, then control proceeds to step 70 where file descriptors are opened that were open at the time the child process was originally created. Then, at step 72 file descriptors are closed that were closed when that particular child process was originally created. This information is available since the child index was saved when each file was created and when each file was closed. Then, at step 74 the child process is created using the fork( ) system call. In this way, the newly created child process inherits the file descriptors from its parent process, just as it did before the processes were checkpointed. If the process has multiple offspring, they all inherit the file descriptors that they originally inherited before taking the checkpoint, and they are restored with the proper sharing of the file descriptors. At step 76 the parent process makes note of the child process's new process identifier so that it can be mapped to the child process's original process identifier in the various system calls that use a process identifier as noted above. Control then loops back to decision step 68.

If, at decision step 68, there are no remaining children of the process being restored, control proceeds to final step 78 at which files are restored that were opened after the last child was forked.

Figure 7:
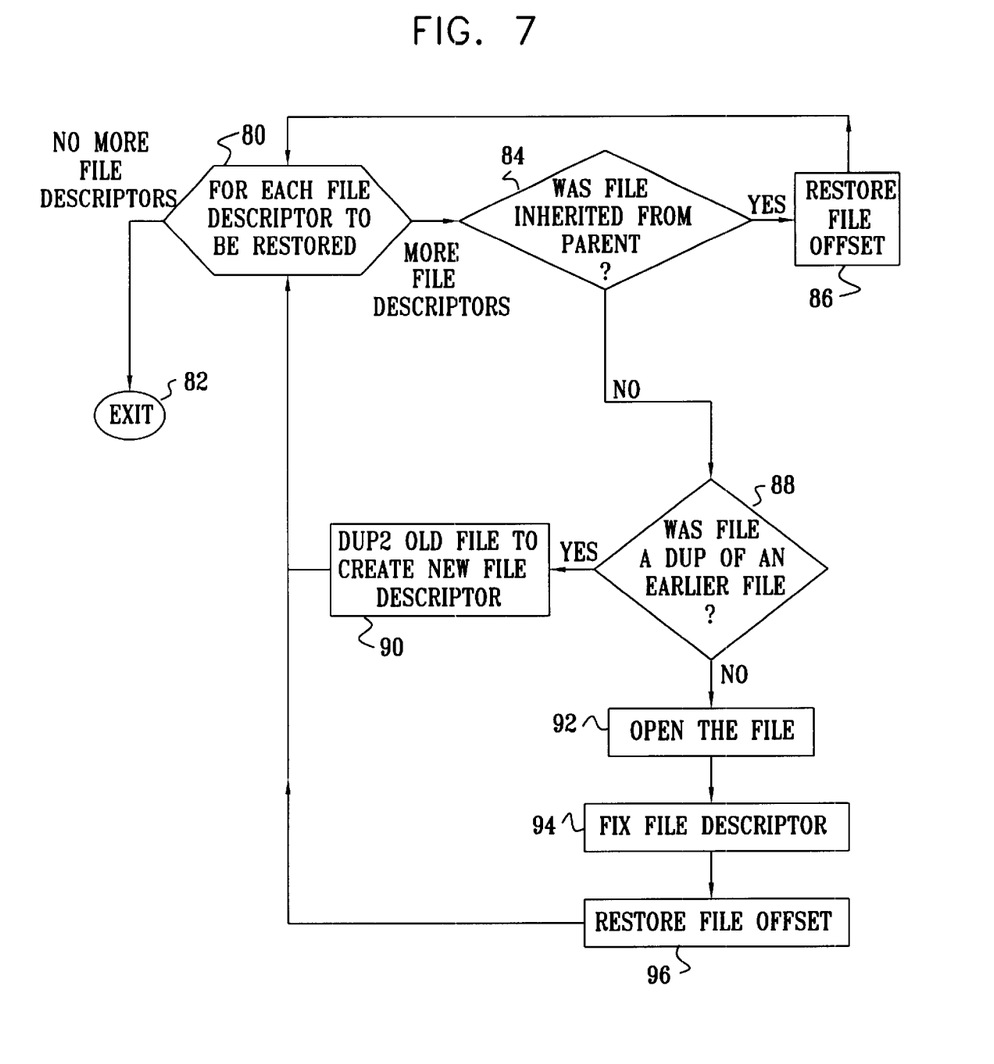
FIG. 7 is a detailed flow chart illustrating the process of restoring file descriptors while restoring a family of processes as shown in FIG. 6.

The procedure needed to restore file descriptors at step 70 is depicted in further detail in FIG. 7. It is important to note that the order in which the files were originally created is preserved. This permits the proper execution of dup( ) operations of file descriptors that already exist in the restored process if they existed in the original checkpointed process. In this way the file descriptors associated with the restored process are guaranteed to have the same numerical values that they possessed at checkpoint time. When a file is opened, the system assigns a file descriptor, which is not necessarily the same file descriptor that had been assigned prior to checkpoint time. In order to obtain the correct file descriptor, the dup2 ( ) system call, or its equivalent is systematically invoked. In the UNIX environment, by restoring the file descriptors in exactly the same order in which they were created, assignment of corresponding file descriptors can be assured. Consistency in the values of the file descriptors can be assured by use of the dup2 ( ) system call. The dup2 ( ) system call takes two parameters as input: an old file descriptor number and a new file descriptor number. The user uses dup2 ( ) to choose the new file descriptor number that he wants to use to reference the file object that is currently referenced by the old file descriptor number. After invoking the dup2 ( ) system call on the file descriptor to obtain the correct value, the file descriptor having an incorrect number is no longer needed and is closed.

At decision step 80 a test is made to determine if there are file descriptors to be restored. If not, then the procedure simply terminates at step 82. Otherwise at decision step 84 it is determined whether the file is inherited. If so, then the file offset is restored at step 86, after which control returns to decision step 80.

If the file was not inherited, then control proceeds to decision step 88, where it is determined whether the file is a duplicate of another file. If the result of this test is affirmative, then a duplicate file descriptor is created at step 90, using the system call dup2 ( ) or its equivalent. Control then returns to decision step 80.

If the result of the test at decision step 88 is negative, then the file is simply opened at step 92. The file descriptor is then updated at step 94 using the system call dup2 ( ) or its equivalent, and the file offset restored at step 96. Control then returns to decision step 80.

At steps 86 and 96, the offset of the file is conformed to the value of the offset existing at checkpoint time by invoking the lseek( ) system call.

After the child process is forked while restoring the parent, the child process restores its checkpointed state by performing the steps indicated in FIG. 5 in the same manner as was done in the case of the parent process. The procedure of FIG. 5 is performed recursively for all processes in the process family. The child process records the parent's new process identifier in order to map it to the parent's original process identifier in any of the system calls that take a process identifier as a parameter.

Some additional processing is required to properly handle pipes. A pipe is often used as a means to pass data between a parent and child process. At checkpoint time, there may be some data in a pipe. It is therefore not sufficient to recreate the pipe when the processes are restored. The data that was in the pipe at checkpoint time must also be restored. In order to save the data in the pipe at checkpoint time, the contents of the pipe are read, thus emptying out all of its data, and the pipe data is saved in a checkpoint file. The data must be restored to the pipe so that the program can continue to run as if the data in the pipe were untouched. One way to accomplish this is as follows. When a pipe is created, via the intercepted pipes( ) system call, the checkpoint library duplicates the pipe descriptors and saves the extra copy of the pipe descriptors to use at checkpoint time. At checkpoint time, the process that has the pipe open for writing uses its duplicate copy of the pipe descriptors to read the contents of the pipe, and then places the data in its checkpoint file. The process then immediately copies the data back into the pipe so that the program can continue to run. Upon restart, the restored process that has the pipe open for writing reads the pipe data from its checkpoint file, and places the pipe data back into the pipe.

It is possible for a process to exit while its children continue to run. In this case, it is possible that at checkpoint time there are file descriptors that were inherited from the exited process that are shared among processes that are being checkpointed. It is important to maintain the file descriptor information of the exited process so that the remaining processes are restored with the proper file descriptor relationships. This is accomplished by checkpointing a process when it is about to exit, for example, by intercepting its exit( ) call, and saving the necessary information. Upon restart, the exited process is restored to its state just before it exited, after having set up its children with the proper file descriptors. The exited process then proceeds to exit, while its checkpoint file remains intact for future restart attempts.

After performing the above restoration method for all of the processes that were checkpointed, the family of processes are restored to the same state as they had at the time of taking the checkpoint, with the pre-checkpoint parent-child relationships intact. These processes continue to share file descriptors in the same way they were shared at the time of taking the checkpoint.

While this invention has been explained with reference to the structure disclosed herein, it is not confined to the details set forth and this application is intended to cover any modifications and changes as may come within the scope of the following claims:

What is claimed is:

1. A method of restoring interrelated computer processes, comprising the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value;

maintaining a record of an order in which pre-checkpoint files were opened by each of said members, wherein said step of restoring comprises:

identifying a first file descriptor of an associated inherited file from a parent process of said restored process group thereof;

responsive to said record of said order, executing a file duplication system call corresponding to said first file descriptor to yield a second file descriptor, wherein a value of said second file descriptor equals said pre-checkpoint value of said first file descriptor; and closing said associated inherited file that corresponds to said first file descriptor.

2. The method according to claim 1, wherein one of said pre-checkpoint files is a pipe, and said step of checkpointing further comprises the steps of:

duplicating a pipe descriptor of said pipe to define a duplicate pipe descriptor and storing said duplicate pipe descriptor;

thereafter reading data from said pipe;

storing said data to define stored data;

rewriting said data into said pipe;

and said step of restoring further comprises the steps of:

retrieving said stored data; and writing said stored data into a restored pipe of said restored process group corresponding to said duplicate pipe descriptor.

3. A method of restoring interrelated computer processes, comprising the steps of:

at an application level checkpointing a plurality of members of a process group at a checkpoint time; and restoring said members to define a restored process group, wherein interrelationships of said members which existed immediately prior to said checkpoint time are unchanged among corresponding members of said restored process group, wherein said step of checkpointing comprises the step of identifying a first process identifier of a first child process;

said step of restoring comprises the steps of:

creating a second child process that corresponds to said first child process;

identifying a second process identifier of said second child process;

intercepting a first system call that uses said first process identifier; and substituting said second process identifier for said first process identifier in said first system call.

4. The method according to claim 3, wherein said step of identifying said second process identifier is performed by:

executing a second system call to create a third child process; and identifying a return value of said second system call.

5. The method according to claim 4, wherein said second system call is a fork( ) call.

6. The method according to claim 4, further comprising the step of invoking a third system call to direct a signal to said third child process, wherein said first process identifier is a parameter of said third system call.

7. The method according to claim 6, wherein said third system call is a kill( ) call.

8. The method according to claim 4, further comprising the step of delaying until said third child process has exited;

wherein said step of delaying is performed by invoking a fourth system call, wherein said first process identifier is a parameter of said fourth system call.

9. The method according to claim 4, further comprising the step of delaying until said third child process has exited;

wherein said step of delaying is performed by invoking a fourth system call, wherein said first process identifier is a return value of said fourth system call.

10. The method according to claim 9, wherein said fourth system call is a wait( ) call.

11. A method of restoring interrelated computer processes, comprising the steps of:

at an application level checkpointing a plurality of members of a process group at a checkpoint time; and restoring said members to define a restored process group, wherein interrelationships of said members which existed immediately prior to said checkpoint time are unchanged among corresponding members of said restored process group, wherein said step of checkpointing comprises:

simultaneously transmitting a checkpoint signal to said members of said process group, and responsive to said checkpoint signal, concurrently initiating said step of checkpointing in all said members of said process group; wherein said checkpoint signal is generated by a killpg( ) system call.

12. A method of restoring interrelated computer processes, comprising the steps of:

at an application level checkpointing a plurality of members of a process group at a checkpoint time; and restoring said members to define a restored process group, wherein interrelationships of said members which existed immediately prior to said checkpoint time are unchanged among corresponding members of said restored process group; and memorizing in each of said members of said process group a number of child processes created therefrom.

13. The method according to claim 12, further comprising the steps of:

maintaining a first record in each of said members of said process group of a first process identifier of each of said child processes created therefrom; and maintaining a second record in each of said corresponding members of said restored process group comprising a second process identifier of each second child process corresponding to each of said child processes.

14. A method of restoring interrelated computer processes, comprising the steps of:

at an application level checkpointing a plurality of members of a process group at a checkpoint time; and restoring said members to define a restored process group, wherein interrelationships of said members which existed immediately prior to said checkpoint time are unchanged among corresponding members of said restored process group, wherein said step of checkpointing further comprises the steps of:
checkpointing an exiting process at an exit time that is prior to said checkpoint time; and
storing information of said exiting process;
and said step of restoring further comprises the steps of:
recreating said exiting process in accordance with said stored information; and thereafter
restoring children of said exiting process.

15. A computer software product, comprising a computer-readable medium in which computer program instructions are stored, which instructions, when read by a computer, cause the computer to perform the steps of:
at an application level checkpointing a plurality of members of a process group at a checkpoint time;
restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value; andmaintaining a record of an order in which pre-checkpoint files were opened by each of said members, wherein said step of restoring comprises:
identifying a first file descriptor of an associated inherited file from a parent process of said restored process group thereof;
responsive to said record of said order, executing a file duplication system call corresponding to said first file descriptor to yield a second file descriptor, wherein a value of said second file descriptor equals said pre-checkpoint value of said first file descriptor; and
closing said associated inherited file that corresponds to said first file descriptor.

16. The computer software product according to claim 15, wherein one of said pre-checkpoint files is a pipe, and said step of checkpointing further comprises the steps of:
duplicating a pipe descriptor of said pipe to define a duplicate pipe descriptor and storing said duplicate pipe descriptor;
thereafter reading data from said pipe;
storing said data to define stored data;
rewriting said data into said pipe;
and said step of restoring further comprises the steps of:
retrieving said stored data; and
writing said stored data into a restored pipe of said restored process group corresponding to said duplicate pipe descriptor.

17. A computer software product, comprising a computer-readable medium in which computer program instructions are stored, which instructions, when read by a computer, cause the computer to perform the steps of:
at an application level checkpointing a plurality of members of a process group at a checkpoint time;
restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value, wherein said step of checkpointing comprises the step of identifying a first process identifier of a first child process;
said step of restoring comprises the steps of:
creating a second child process that corresponds to said first child process;
identifying a second process identifier of said second child process;
intercepting a first system call that uses said first process identifier; and
substituting said second process identifier for said first process identifier in said first system call.

18. The computer software product according to claim 17, wherein said computer further performs the steps of:
executing a second system call to create a third child process; and
identifying a return value of said second system call.

19. The computer software product according to claim 18, wherein said second system call is a fork( ) call.

20. The computer software product according to claim 18, wherein said computer further performs the step of invoking a third system call to direct a signal to said third child process, wherein said first process identifier is a parameter of said third system call.

21. The computer software product according to claim 20, wherein said third system call is a kill( ) call.

22. The computer software product according to claim 18, wherein said computer further performs the step of delaying until said third child process has exited;
wherein said step of delaying is performed by invoking a fourth system call, wherein said first process identifier is a parameter of said fourth system call.

23. The computer software product according to claim 18, wherein said wherein said computer further performs the step of delaying until said third child process has exited;
wherein said step of delaying is performed by invoking a fourth system call, wherein said first process identifier is a return value of said fourth system call.

24. The computer software product according to claim 23, wherein said fourth system call is a wait( ) call.

25. A computer software product, comprising a computer-readable medium in which computer program instructions are stored, which instructions, when read by a computer, cause the computer to perform the steps of:
at an application level checkpointing a plurality of members of a process group at a checkpoint time;
restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value, wherein said step of checkpointing comprises:
simultaneously transmitting a checkpoint signal to said members of said process group; and
responsive to said checkpoint signal, concurrently initiating said step of checkpointing in all said members of said process group, wherein said checkpoint signal comprises a killpg( ) system call.

26. A computer software product, comprising a computer-readable medium in which computer program instructions are stored, which instructions, when read by a computer, cause the computer to perform the steps of:
at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value; and memorizing in each of said members of said process group a number of child processes created therefrom.

27. The computer software product according to claim 26, further comprising the steps of:

maintaining a first record in each of said members of said process group of a first process identifier of each of said child processes created therefrom; and maintaining a second record in each of said corresponding members of said restored process group comprising a second process identifier of each second child process corresponding to each of said child processes.

28. A computer software product, comprising a computer-readable medium in which computer program instructions are stored, which instructions, when read by a computer, cause the computer to perform the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value, wherein said step of checkpointing further comprises the steps of:

checkpointing an exiting process at an exit time that is prior to said checkpoint time; and storing information of said exiting process;

and said step of restoring further comprises the steps of:
restoring children of said exiting process; and
thereafter recreating said exiting process responsive to said information of said exiting process at said exit time.

29. A computer system, comprising:

a memory for storage of program instructions; and an execution unit that accesses said program instructions in said memory for execution thereof, wherein said program instructions cause the computer to perform the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein at least two of said members share file descriptors immediately prior to said checkpoint time, each of said file descriptors having a pre-checkpoint value, wherein the computer further performs the steps of:

maintaining a record of an order in which pre-checkpoint files were opened by each of said members, wherein said step of restoring comprises:

identifying a first file descriptor of an associated inherited file from a parent process of said restored process group thereof;

responsive to said record of said order, executing a file duplication system call corresponding to said first file descriptor to yield a second file descriptor, wherein a value of said second file descriptor equals said pre-checkpoint value of said first file descriptor; and closing said associated inherited file that corresponds to said first file descriptor.

30. The computer system according to claim 29, wherein one of said pre-checkpoint files is a pipe, and said step of checkpointing further comprises the steps of:

duplicating a pipe descriptor of said pipe to define a duplicate pipe descriptor and storing said duplicate pipe descriptor;

thereafter reading data from said pipe;

storing said data to define stored data;

rewriting said data into said pipe;

and said step of restoring further comprises the steps of:
retrieving said stored data; and
writing said stored data into a restored pipe of said restored process group corresponding to said duplicate pipe descriptor.

31. A computer system, comprising:

a memory for storage of program instructions; and an execution unit that accesses said program instructions in said memory for execution thereof, wherein said program instructions cause the computer to perform the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein said step of checkpointing comprises the step of identifying a first process identifier of a first child process;

said step of restoring comprises the steps of:
creating a second child process that corresponds to said first child process;
identifying a second process identifier of said second child process;
intercepting a system call that uses said first process identifier; and
substituting said second process identifier for said first process identifier in said system call.

32. The computer system according to claim 31, wherein said step of identifying said second process identifier is performed by:

executing a second system call to create a third child process; and identifying a return value of said second system call.

33. The computer system according to claim 32, wherein said second system call is a fork( ) call.

34. The computer system according to claim 32, wherein said computer further performs the step of invoking a third system call to direct a signal to said third child process, wherein said first process identifier is a parameter of said third system call.

35. The computer system according to claim 34, wherein said third system call is a kill( ) call.

36. The computer system according to claim 32, wherein said computer further performs the step of delaying until said third child process has exited;

wherein said step of delaying is performed by invoking a fourth system call, wherein said first process identifier is a return value of said fourth system call.

37. The computer system according to claim 32, wherein said computer further performs the step of delaying until said third child process has exited;

wherein said step of delaying is performed by invoking a fourth system call, wherein said first process identifier is a parameter of said fourth system call.

38. The computer system according to claim 37, wherein said fourth system call is a wait( ) call.

39. A computer system, comprising:

a memory for storage of program instructions; and an execution unit that accesses said program instructions in said memory for execution thereof, wherein said program instructions cause the computer to perform the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein said step of checkpointing comprises:

simultaneously transmitting a checkpoint signal to said members of said process group; and responsive to said checkpoint signal, concurrently initiating said step of checkpointing in all said members of said process group, wherein said checkpoint signal comprises a killpg( ) system call.

40. A computer system, comprising:

a memory for storage of program instructions; and an execution unit that accesses said program instructions in said memory for execution thereof, wherein said program instructions cause the computer to perform the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group; and memorizing in each of said members of said process group a number of child processes created therefrom.

41. The computer system according to claim 40, further comprising the steps of:

maintaining a first record in each of said members of said process group of a first process identifier of each of said child processes created therefrom; and maintaining a second record in each of said corresponding members of said restored process group comprising a second process identifier of each second child process corresponding to each of said child processes.

42. A computer system, comprising:

a memory for storage of program instructions; and an execution unit that accesses said program instructions in said memory for execution thereof, wherein said program instructions cause the computer to perform the steps of:

at an application level checkpointing a plurality of members of a process group at a checkpoint time;

restoring said members to define a restored process group, wherein interrelationships of said members which existed immediately prior to said checkpoint time are unchanged among corresponding members of said restored process group, wherein said step of checkpointing further comprises the steps of:

checkpointing an exiting process at an exit time that is prior to said checkpoint time; and storing information of said exiting process;

and said step of restoring further comprises the steps of:

recreating said exiting process in accordance with said stored information; and thereafter restoring children of said exiting process.

\* \* \* \* \*